United States Patent
Asendorf et al.

(10) Patent No.: US 11,847,661 B2
(45) Date of Patent: Dec. 19, 2023

(54) IMAGE BASED COUNTERFEIT DETECTION

(71) Applicant: 3M INNOVATIVE PROPERTIES COMPANY, St. Paul, MN (US)

(72) Inventors: Nicholas A. Asendorf, St. Paul, MN (US); Jennifer F. Schumacher, Woodbury, MN (US); Robert D. Lorentz, North Oaks, MN (US); James B. Snyder, Minneapolis, MN (US); Golshan Golnari, Maple Grove, MN (US); Muhammad Jamal Afridi, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 340 days.

(21) Appl. No.: 16/766,118

(22) PCT Filed: Nov. 15, 2018

(86) PCT No.: PCT/IB2018/059014
§ 371 (c)(1),
(2) Date: May 21, 2020

(87) PCT Pub. No.: WO2019/106474
PCT Pub. Date: Jun. 6, 2019

(65) Prior Publication Data
US 2020/0364513 A1    Nov. 19, 2020

Related U.S. Application Data

(60) Provisional application No. 62/592,845, filed on Nov. 30, 2017.

(51) Int. Cl.
*G06Q 30/00*    (2023.01)
*G06Q 30/018*   (2023.01)
(Continued)

(52) U.S. Cl.
CPC ........ *G06Q 30/0185* (2013.01); *G06F 16/53* (2019.01); *G06F 16/55* (2019.01);
(Continued)

(58) Field of Classification Search
None
See application file for complete search history.

(56) References Cited

U.S. PATENT DOCUMENTS 7,495,214 B2   2/2009  Pan
7,706,700 B2   4/2010  Pan
(Continued)

FOREIGN PATENT DOCUMENTS

CN   1315707   10/2001
CN   1430175    7/2003
(Continued)

OTHER PUBLICATIONS

Geurts, "Extremely randomized trees", Machine Learning, Mar. 2006, vol. 63, No. 1, pp. 3-42.
(Continued)

*Primary Examiner* — Leon Viet Q Nguyen
(74) *Attorney, Agent, or Firm* — Sriram Srinivasan; Yufeng Dong

(57) ABSTRACT

Systems and methods for authenticating material samples are provided. Digital images of the samples are processed to extract computer-vision features, which are used to train a classification algorithm along with location and optional time information. The extracted features/information of a test sample are evaluated by the trained classification algorithm to identify the test sample. The results of the evaluation are used to track and locate counterfeits or authentic products.

14 Claims, 11 Drawing Sheets

(51) Int. Cl.
*G06T 7/73* (2017.01)
*G06F 16/55* (2019.01)
*G06F 16/53* (2019.01)
*G06N 20/00* (2019.01)
*G06F 16/56* (2019.01)
*G06N 5/04* (2023.01)
*G06T 7/00* (2017.01)
*G06F 18/24* (2023.01)
*G06F 18/214* (2023.01)
*G06V 10/764* (2022.01)
*G06V 10/44* (2022.01)
*G06V 10/50* (2022.01)
*G06V 10/46* (2022.01)

(52) U.S. Cl.
CPC ............ *G06F 16/56* (2019.01); *G06F 18/214* (2023.01); *G06F 18/24* (2023.01); *G06N 5/04* (2013.01); *G06N 20/00* (2019.01); *G06T 7/0004* (2013.01); *G06T 7/73* (2017.01); *G06V 10/449* (2022.01); *G06V 10/50* (2022.01); *G06V 10/764* (2022.01); *G06T 2200/24* (2013.01); *G06T 2207/30108* (2013.01); *G06V 10/467* (2022.01)

(56) References Cited

U.S. PATENT DOCUMENTS

| | | | |
|---|---|---|---|
| 7,715,733 B2 | 5/2010 | Pan | |
| 7,920,714 B2 | 4/2011 | O'neil | |
| 8,180,174 B2 | 5/2012 | Di Venuto | |
| 8,503,756 B2 | 8/2013 | Chang | |
| 8,714,442 B2 | 5/2014 | Sharma | |
| 9,206,550 B2 | 12/2015 | Sun | |
| 9,208,394 B2 | 12/2015 | Di Venuto | |
| 9,269,161 B2 | 2/2016 | Wei | |
| 2004/0197535 A1 | 10/2004 | Bleckmann | |
| 2010/0088522 A1 | 4/2010 | Barrus | |
| 2011/0112685 A1 | 5/2011 | Clark | |
| 2014/0201094 A1 | 7/2014 | Herrington | |
| 2015/0089615 A1 | 3/2015 | Krawczyk | |
| 2015/0100249 A1 | 4/2015 | Torri | |
| 2016/0314474 A1* | 10/2016 | Schibi | G06Q 30/018 |
| 2017/0032285 A1* | 2/2017 | Sharma | G06N 3/084 |
| 2017/0032382 A1* | 2/2017 | Shulman | G06Q 30/0185 |
| 2017/0206632 A1* | 7/2017 | Milanfar | G06T 5/003 |
| 2018/0247151 A1* | 8/2018 | Talyansky | G06F 16/5866 |

FOREIGN PATENT DOCUMENTS

| | | | | |
|---|---|---|---|---|
| CN | 103236055 | | 8/2013 | |
| CN | 105701476 A | | 6/2016 | |
| CN | 107148632 A | | 9/2017 | |
| CN | 107358264 A | | 11/2017 | |
| WO | WO 2011-077459 | | 6/2011 | |
| WO | WO 2016-099981 | | 6/2016 | |
| WO | WO2016099981 A1 * | | 6/2016 | ............ G01N 21/64 |
| WO | WO 2016-133573 | | 8/2016 | |

OTHER PUBLICATIONS

International Search Report for PCT International Application No. PCT/IB2018/059014, dated Mar. 4, 2019, 3 pages.

* cited by examiner

IMAGE BASED COUNTERFEIT DETECTION

CROSS REFERENCE TO RELATED APPLICATIONS

This application is a national stage filing under 35 U.S.C. 371 of PCT/IB2018/059014, filed Nov. 15, 2018, which claims the benefit of U.S. Application No. 62/592,845, filed Nov. 30, 2017, the disclosure of which is incorporated by reference in its/their entirety herein.

TECHNICAL FIELD

The present disclosure relates to methods and systems for counterfeit detecting, locating and tracking based on images of material samples.

BACKGROUND

Counterfeiting is a global problem. Various systems and methods for authenticating goods, products, or materials are described. U.S. Patent Application Publication No. 20040197535, U.S. Pat. Nos. 7,495,214, 7,706,700, and 7,715,733 describe various techniques to address counterfeiting and authenticate goods, products, or materials. U.S. Pat. No. 8,714,442 describes a system and method of securing articles along a supply chain.

SUMMARY

In a multitude of industries and applications, there is a desire to authenticate material samples, goods, or products in an efficient, and cost-effective way. Typically, when a product or sample is suspected to be counterfeit, it is shipped to the provider, and eventually makes its way to a technical expert who inspects the product under specific laboratory tests to determine whether it is counterfeit. Such a process of identifying counterfeits can be very time-consuming. In particular, it is challenging to locate and track counterfeit products, and figure out a supply chain thereof. For example, it might be difficult to know how many types of counterfeit product are on the market, where the counterfeits originate, how the counterfeits are distributed throughout the supply chain, etc. The present disclosure provides anti-counterfeiting methods and systems that can identify, locate, and track counterfeit products.

Briefly, in one aspect, the present disclosure describes a computer-implemented method of tracking and locating a counterfeit product. The method includes extracting, via a processor, computer-vision features from a digital image of a test sample; obtaining location information and optional time information of the test sample; and evaluating, via a trained classification algorithm associated with the processor, the computer-vision features and the location information of the test sample to identify the test sample.

In another aspect, the present disclosure describes a system of tracking and locating a counterfeit product. The system includes a graphical user interface (GUI) provided to a mobile device, the mobile device being capable of obtaining, via the GUI, a digital image for a sample to be tested; a computation component functionally connected to the mobile device, configured to receive the images from the GUI, and process the images to extract computer-vision features from the digital image, the computation component further configured to receive location information and optional time information of the sample; and a trained classification algorithm associated with the computation component, the trained classification algorithm being configured to evaluate the computer-vision features and the location information of the sample to identify the sample.

Various unexpected results and advantages are obtained in exemplary embodiments of the disclosure. One such advantage of exemplary embodiments of the present disclosure is that computer-vision features and location and time information can be automatically extracted from images of material samples, and applied to train a classification algorithm for identifying a new sample. The present disclosure provides anti-counterfeiting methods and systems that can be proactive (e.g., used in the field without laboratory testing) and non-invasive (e.g., requiring no changes to the product or packaging to be tested). The anti-counterfeiting methods and systems described herein can effectively identify, locate, and track counterfeit products in a distribution network.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which.

Figure 1:
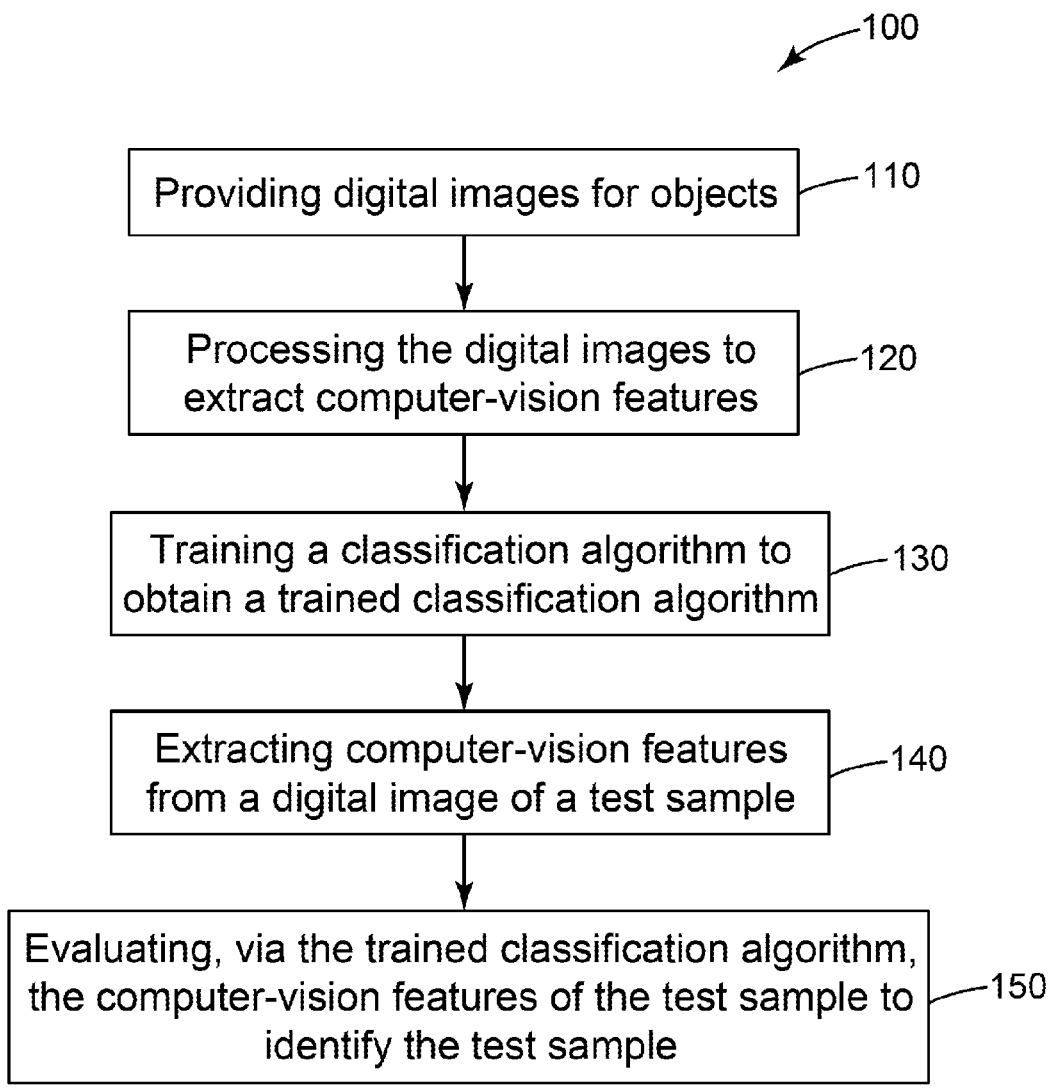
FIG. 1 is a flow diagram of a method for authenticating material samples, according to one embodiment.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

In a multitude of industries and applications, there is a desire to authenticate materials, goods, or products in an efficient, and cost-effective way. Typically, when a product is suspected to be counterfeit, it is shipped to the provider, and eventually makes its way to a technical expert who inspects the product under specific laboratory tests to determine whether it is counterfeit. Such process of identifying counterfeits can be very time-consuming. The present disclosure provides anti-counterfeiting methods and systems that can be proactive (e.g., used in the field without laboratory testing) and non-invasive (e.g., requiring no changes to the product or packaging to be tested).

The systems and methods described herein are provided to identify a material sample as authentic, counterfeit, or a member of a batch of material samples. The authentication of material samples can be based on material properties of the samples. In some embodiments, the specific material properties can be represented by computer-vision features extracted from images of the samples.

FIG. 1 illustrates a computer-implemented method 100 of authenticating material samples, according to one embodiment. The material samples may include a set of authentic samples, and optionally, a set of counterfeit samples. In some embodiments, the set of material samples each may belong to a batch of material samples that contain substantially the same material configurations and/or are produced by substantially the same processes. In some embodiments, the material samples can be selected from, for example, abrasives, optical films, nonwovens, and products made therefrom, which are commercially available from 3M Company, Saint Paul, MN, or counterfeits thereof. One typical material sample is respirators (e.g., molded respirators or flat-fold respirators) including nonwoven materials.

At 110, one or more digital images for objects (e.g., material samples) are provided to a processor. The digital images can be captured by any suitable camera such as, for example, a digital camera incorporated into a mobile device such as a mobile phone. The size of the captured image may be, for example, about 200×200 pixels to about 10,000×10,000 pixels. The captured image can be in any suitable format such as, for example, JPEG, Exif, TIFF, BMP, GIF, PNG, etc. The method 100 then proceeds to 120.

At 120, the digital images are processed, via the processor, to extract computer-vision features. The computer-vision features can represent characteristic features of the material samples. For example, a digital image of a material sample may include pixels having various intensities/colors which may be related to a structure, a substructure, or a texture of the material sample. In some embodiments, processing the image of a respirator can extract computer-vision features representing a texture of the respirator material (e.g., a nonwoven material). The characteristic features of a material sample may include, for example, an optical feature (e.g., intensity, color, etc.), a surface pattern feature, an acoustical feature (e.g., frequency absorption), an elastic feature (e.g., modulus), a structural feature (e.g., shape), an electronic feature (e.g., resistance), a magnetic feature (e.g., field strength), an electrets related feature (e.g., dielectric), a mechanical feature (e.g., yield strength), etc. The method 100 then proceeds to 130.

At 130, a classification algorithm is trained by using training data (e.g., the extracted computer-vision features) to obtain a trained classification algorithm. A classification algorithm described herein refers to a computer-implemented method/model/algorithm used to identify an unknown object or material sample. The input to a classification algorithm can be an image of the unknown object and the output can be a label (e.g., 1 or 0) that identifies the object. A classification algorithm can be typically trained by providing a set images of objects. The images can be with/without known identities or labels. By training a classification algorithm, all the necessary model parameters needed for the algorithm can be determined so as to obtain a trained classification algorithm.

Figure 7A:
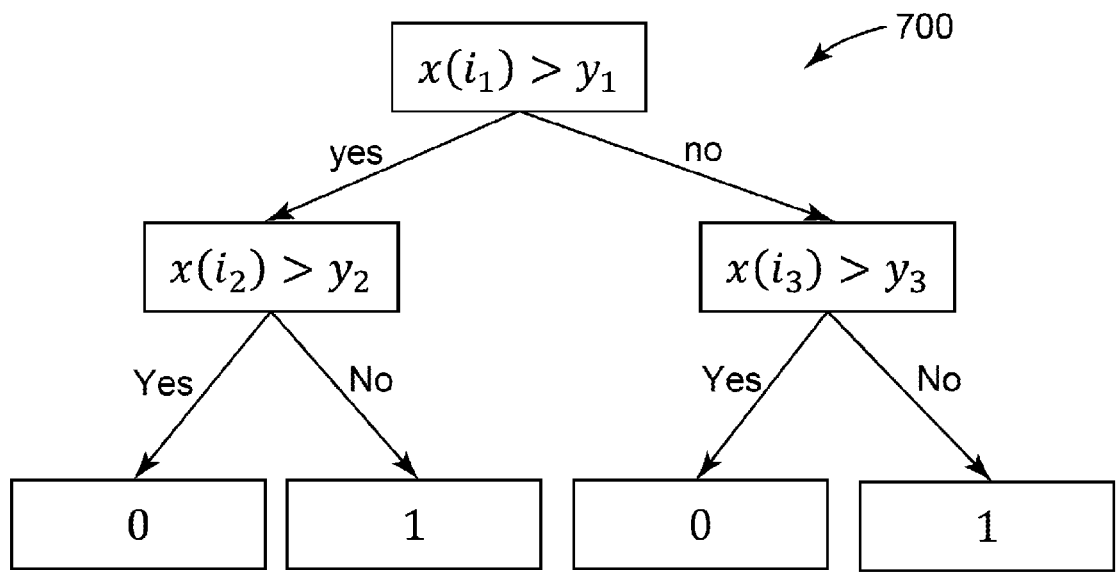
FIG. 7A is a block diagram of an exemplary decision tree model, according to one embodiment.

In some embodiments, the classification algorithm can include a supervised classification algorithm such as, for example, an extra-trees classifier which fuses a number of randomized decision trees to the training data. An exemplary decision tree model is illustrated in FIG. 7A, which will be described further below. It is to be understood that any suitable known classification algorithm can be used, which may include one or more of, for example, a decision tree model, a random forest model, an extra-trees model, a neural network model, a gradient boosting model, a bagging model, an adaptive boosting model, a linear discriminant analysis model, a quadratic discriminant analysis model, a naïve Bayes model, a nearest neighbor model, a radius nearest model, a logistic regression model, etc. By training the classification algorithm with the training data (e.g., the computer-vision features), various parameters of the algorithm or model can be determined, which can result in the trained classification algorithm. The method 100 then proceeds to 140.

At 140, the computer-vision features are extracted from a digital image of a material sample to be tested. The material sample to be tested or test sample may be an authentic sample or a counterfeit, a sample belonging to a batch of identified material samples (authentic or counterfeit) or a new sample to be identified. The computer-vision features of the test sample can be extracted in the similar manner as for that of the material samples at 120, which will be described further below. The method 100 then proceeds to 150.

At 150, the computer-vision features of the test sample are evaluated, via the trained classification algorithm, to identify the test sample, e.g., to determine whether the test sample is authentic or counterfeit, to determine whether the test sample belongs to a batch of identified material samples, etc. In some embodiments, the computer-vision features of the test sample can be used as input data for the trained classification algorithm, and the output from the trained classification algorithm can be a binary 0/1. For example, when the test sample is authentic, the output is 1; when the test sample is counterfeit, the output is 0.

Figure 2:
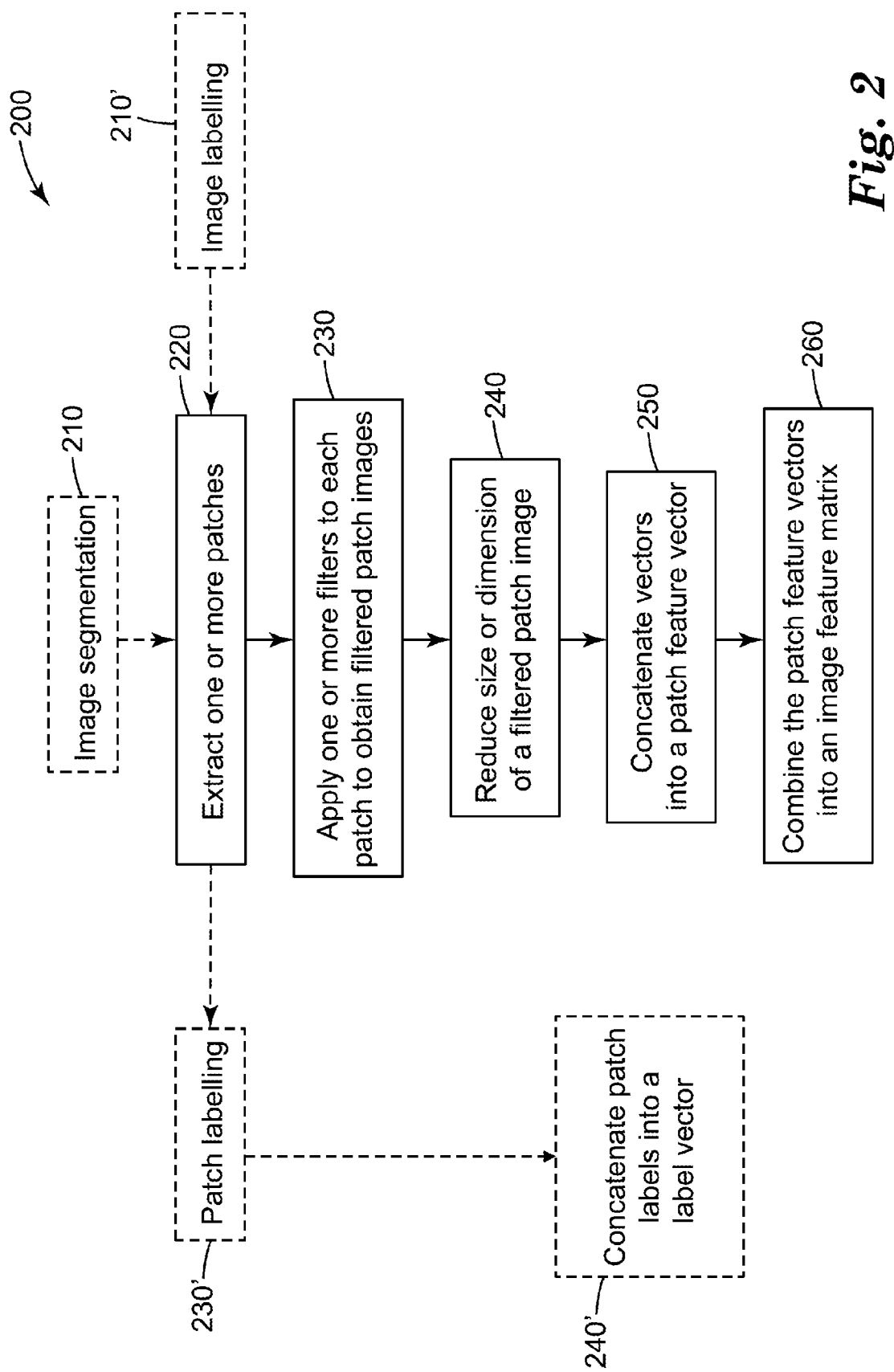
FIG. 2 is a flow diagram of a method for processing sample images, and optionally for labeling sample images, according to one embodiment.

FIG. 2 illustrates a flow diagram of a method 200 for processing sample images, according to one embodiment. At optional 210, a digital image of a material sample can be segmented. The optional step of image segmentation can separate the object (e.g., a material sample such as a respirator) from the background in the image. In some embodiments, the image segmentation can be accomplished by, for example, thresholding the image in a LAB space when the object is different from the background by colors, contrast, etc. The image segmentation may also help to clean up edge regions and impurities (e.g., holes) in the image. In general, the optional step 210 of image segmentation can help to better identify the pixels in the image that belong to the object. The method 200 then proceeds to 220.

Figure 3A:
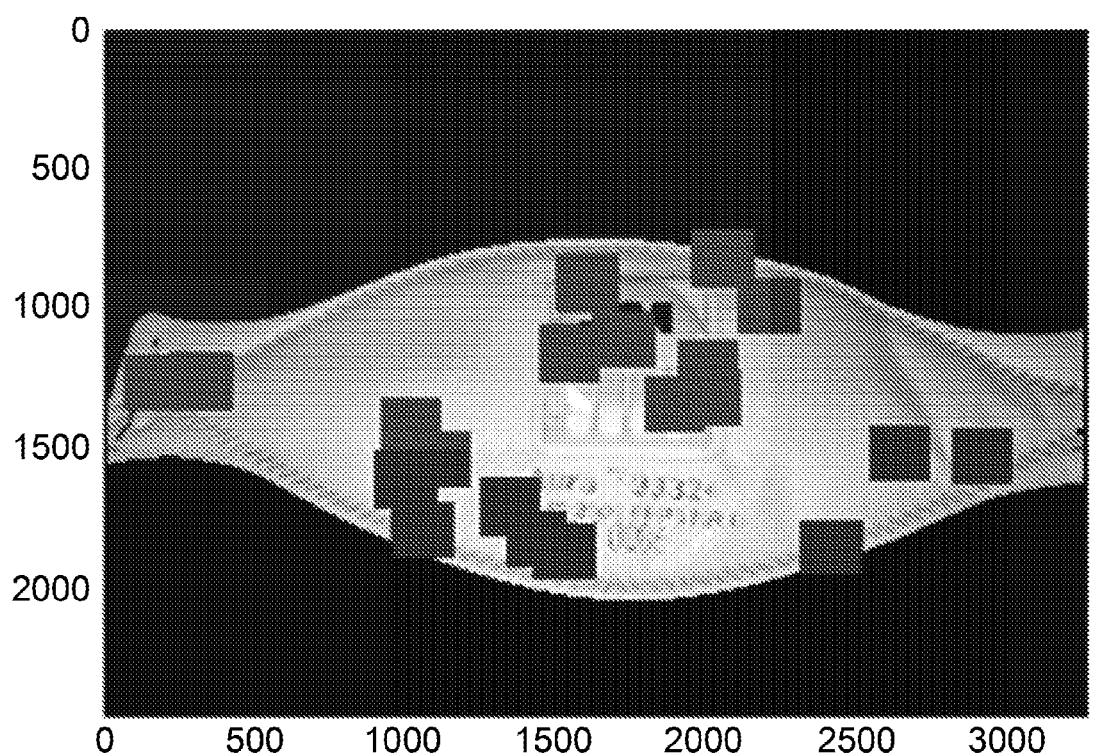
FIG. 3A illustrates a process of extracting patches from a sample image, according to one embodiment.
Figure 3B:
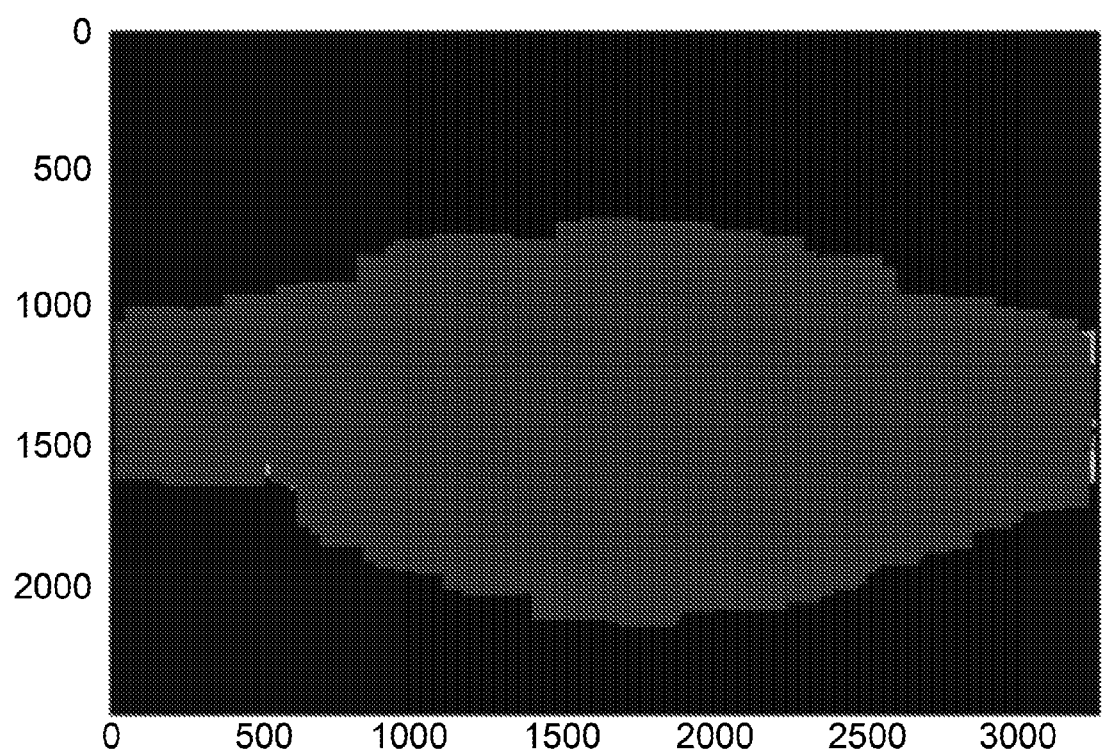
FIG. 3B illustrates a process of extracting patches from a sample image, according to another embodiment.

At 220, one or more patches are extracted from the sample image. The patches can be extracted by sampling image pixels in any suitable manner, for example, random sampling, uniform sampling, or other intelligent sampling approaches. The number/of patches may be, for example, from one to 10,000. Typical numbers may be around several tens to several thousands. The patches may have a polygon shape (e.g., a square shape, a triangular shape, a hexagonal shape, etc.) with a patch size, for example, from 1×1 pixel to 1000×1000 pixels. It is to be understood that the suitable number of patches, the suitable patch shape, and the suitable patch size may depend on properties of the sample images (e.g., size, resolution, shape, quality, etc.). FIG. 3A illustrates an example of patch extraction: 20 patches (201×201 pixels) are plotted on an image of a respirator. FIG. 3B illustrates another example of patch extraction: 1000 patches (201×201 pixels) are plotted on the respirator image to show coverage. The method 200 then proceeds to 230.

Figure 4:
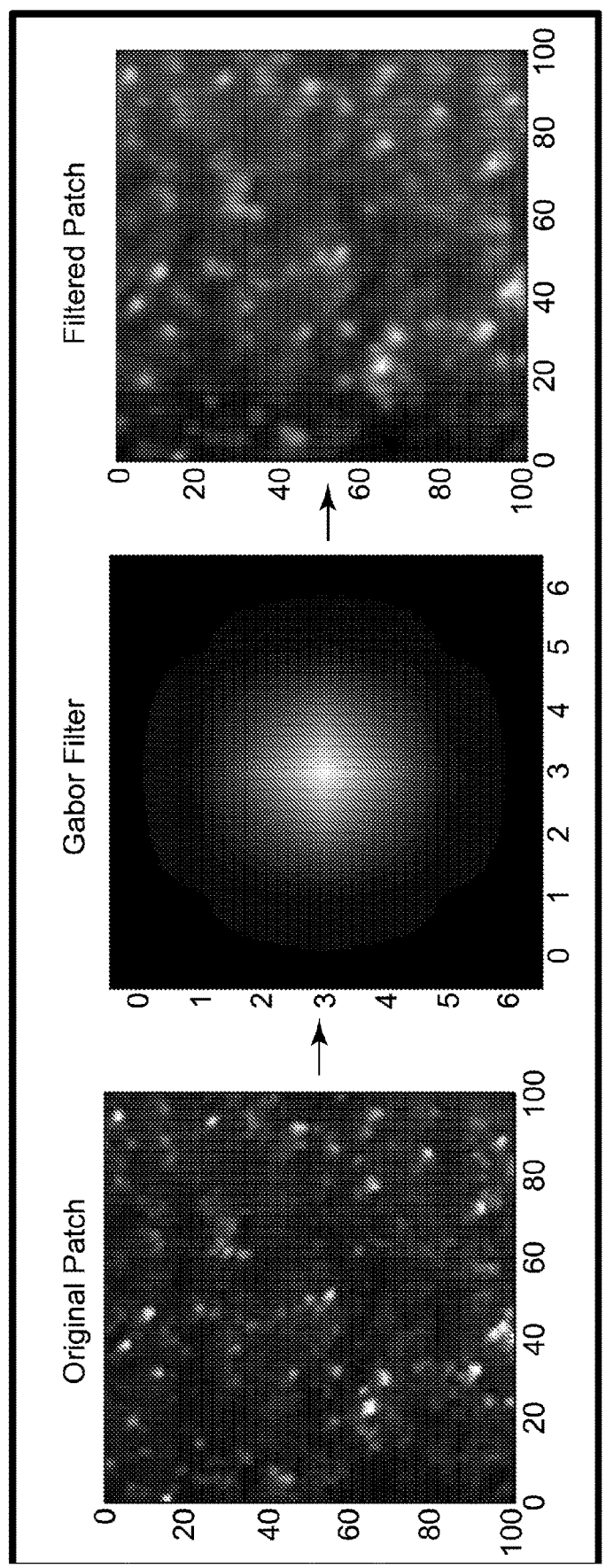
FIG. 4 illustrates a process of applying a filter to a patch image, according to one embodiment.

At 230, one or more filters are applied to each patch to obtain one or more filtered patch images per patch. In some embodiments, each patch can be passed through a series of filters such as, for example, a Gabor filter. The filters are used to extract information related to material properties of the samples. For example, Gabor filters can be used to extract texture information of a non-woven material. The series of filters can have a series of respective parameters, when applied to a patch, resulting in a series of filtered patch images. That is, a number m of filters can be applied to a patch to generate a number m of filtered patch images, where m is an integer (e.g., 8, 16, 32, etc.). For example, the Gabor filters can be applied with a series of kernels (e.g., 16 kernels from 0 to 15), which can result in a series of filtered images (e.g., 16 filtered images) for each patch. FIG. 4 illustrates an exemplary process of applying one of a series of Gabor filters to an original patch image to obtain one of a series of filtered patch images. The filtered patch image of FIG. 4 incorporates texture information of the material (e.g., non-woven) of that patch.

It is to be understood that any suitable digital filters can be used to extract information related to suitable material properties. Suitable digital filters may include, for example, Fourier transforms (for extracting frequency properties), Laplace transform (for extracting frequency properties), Gaussian filters (for extracting texture properties), high-pass filters (for extracting high-frequency components), low-pass filters (for extracting smooth features), band-pass filters (for extracting specific frequency components), median filters (for extracting noise reduction), averaging filters (for extracting noise reduction), Local Binary Patterns (for extracting texture), Laplacian of Gaussian (for extracting edge properties), Sobel filters (for extracting edge properties), Prewitt filters (for extracting edge properties), amongst many others.

In some embodiments, multiple sets of digital filters can be applied, simultaneously or sequentially, to each patch. In some embodiments, a first set of filters (e.g., a series of Gabor filters) can be applied to each patch to obtained filtered patch images; a second filter (e.g., a local binary pattern (LBP) filter) can be applied to each filtered patch image to transfer the filtered patch image into a further filtered patch image (e.g., an LBP image). The algorithm of an LBP filter examines each pixel in a patch image and, for each pixel, examines the 8 neighboring pixels. If a neighboring pixel is larger than the target pixel, it receives a '1'; if neighboring pixel is smaller than the target pixel, it receives a '0'. These eight bits are then concatenated to form an 8-bit sequence, which takes a value between 0 and 255. In this manner, the filtered patch image can be transformed into a LBP patch image with values between 0 and 255 or a "uniform" LBP patch image with values between 0 and 9. After obtaining the filtered patch images for each patch, the method 200 then proceeds to 240.

At 240, the size or dimension of each filtered patch image is reduced. While the filtered patch images can effectively show material properties (e.g., texture) of the patches, the resulting computer-vision related data of a sample image can be big, considering the large number of patches (e.g., 1000 patches or more), the number m (e.g., 16 or more) of the filters applied to each patch, the size of each filtered patch image (e.g., 101×101 pixels), etc. This step can effectively reduce the size of the computer-vision related data by reducing the size or dimension of the filtered patch images for each patch.

Figure 5:
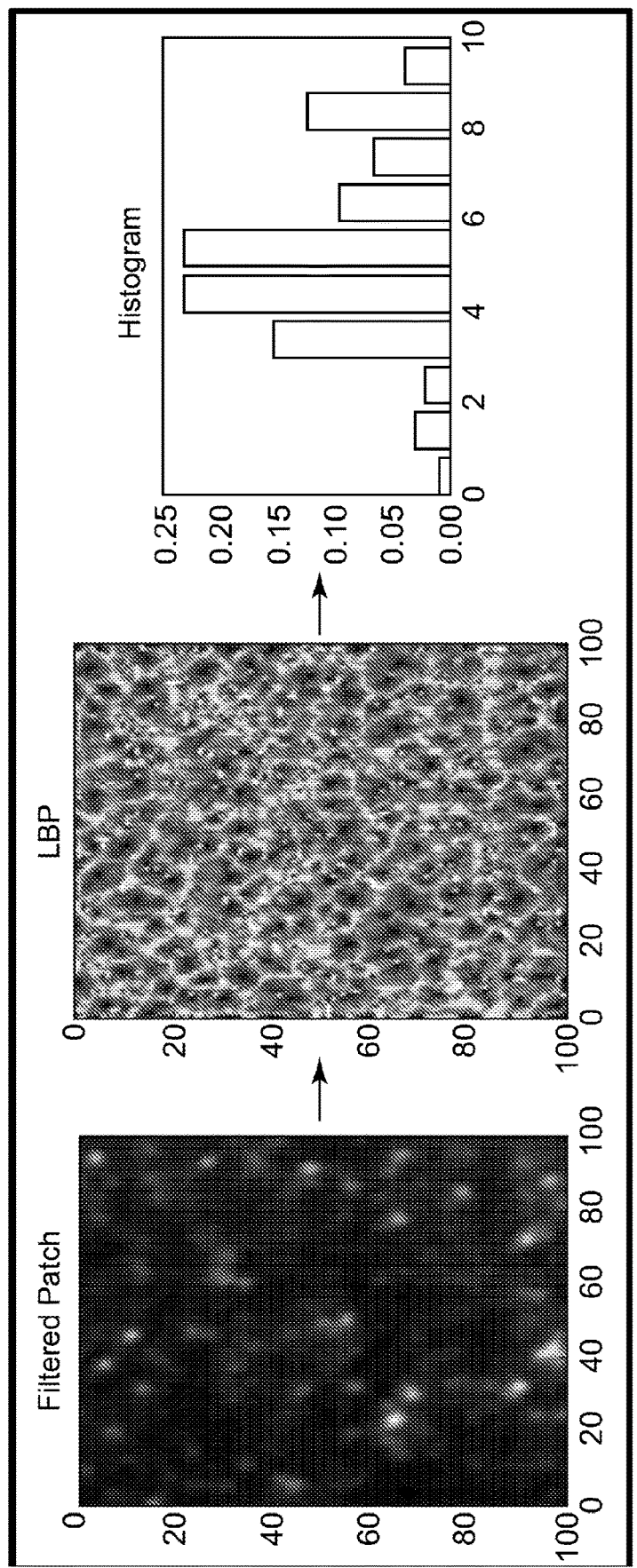
FIG. 5 illustrates a process of reducing a size/dimension of a filtered patch image, according to one embodiment.

In some embodiments, the size or dimension of the filtered patch images can be reduced by vectorizing the images. In some embodiments, a filtered patch image can be converted or transformed into an n-dimensional histogram, and further into an n-dimensional vector, where n can be any suitable integer (e.g., from 1 to 256). For example, for each filtered patch images as shown in FIG. 4, a local binary pattern (LBP) algorithm can be applied to obtain an LBP image. The uniform LBP is rotation invariant and thus needs fewer bits to represent the data. Each LBP patch image can then be transformed into a histogram by counting the number of pixels taking specific values. FIG. 5 illustrates an exemplary process of transferring the filtered patch image of FIG. 4 into an LBP patch image, and transferring the LBP patch image into a histogram (e.g., a 10-dimensional histogram). In some embodiments, the mean and variance of a filtered patch images can be concatenated to the end of the corresponding histogram, resulting in a 12-dimensional vector per filtered patch image (e.g., per kernel). It is to be understood that any suitable vectorizing methods can be used to transform a filtered patch image into an n-dimensional vector. The method 200 then proceeds to 250.

At 250, the computer-vision data related to the filtered patch images are combined for each patch. As described in 230 and 240, in some embodiments, for each patch, a number m of filtered patch images can be obtained with varying parameters (e.g., m kernels); for each filtered patch image, an n-dimensional vector can be obtained. The n-dimensional vectors for the m filtered patch images can be concatenated to form a d-dimensional patch feature vector $x_{patch}$ for each patch, where d=(m×n). For example, for the Gabor filters applied with a series of kernels (e.g., 16 kernels from 0 to 15 corresponding to 16 filtered images), the 12-dimensional vectors of the 16 filtered images can be concatenated to form a final feature vector $x_{patch}$ for the patch, e.g., a 192 (12×16) dimensional feature vector as represented below:

$$x_{patch} = \begin{bmatrix} x_0 \\ \vdots \\ x_{15} \end{bmatrix}, x_i = \begin{bmatrix} lbp_0 \\ \vdots \\ lbp_9 \\ kern_{mean} \\ kern_{var} \end{bmatrix} \quad (1)$$

The above process for combining filtered patch images can be repeated for each patch to obtain a number l of such d-dimensional patch feature vectors for each image, where l is the total number of patches extracted from a sample image, and d=(m×n) is the dimension of a patch feature vector $x_{patch}$.

At 260, the computer-vision data for the patches are combined for each image. For an image having l patches, the number l of such d-dimensional patch feature vectors $x_{patch}$ can be further combined to form a (k×l)×d matrix of feature vectors, where k is the total number of sample images.

Optionally, the method 200 can provide a label for each image. At 210', each sample image can be labelled as authentic or counterfeit. For example, an authentic sample can be assigned to a value "1"; a counterfeit can be assigned to a value "0". At 220, the number l of patches are extracted from each sample image. At 230', each patch inherits the label from its parent image. For example, all the patches from an authentic sample are labelled as "1"; all the patches from a counterfeit are labelled as "0". At 240', the patch labels are concatenated into a label vector. The label vector can be an l-dimensional vector of binary (1/0) label, where l is the number of patches from a sample image. The label vectors for each image can be further combined to form a (k×l)×1 vector, where k is the total number of sample images.

Figure 6A:
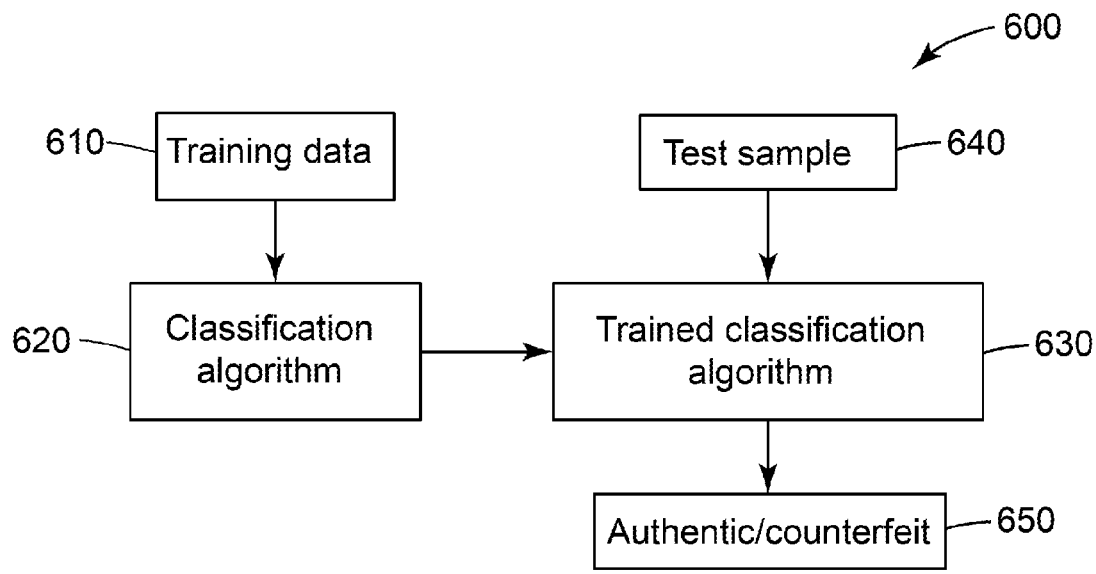
FIG. 6A is a flow diagram of a method for obtaining a trained classification algorithm and using the trained classification algorithm to evaluate a test sample, according to one embodiment.

The data resulting from the method 200 of processing sample images can be applied as training data to train a classification algorithm to obtain a trained classification algorithm. FIG. 6A illustrates a method 600 of training a classification algorithm and evaluating a test sample using the trained classification algorithm, according to one embodiment. At 610, training data are provided, e.g., from the method 200 of processing sample images. The training data may include, for example, the computer-vision data such as the (k×l)×d matrix of feature vectors. It is to be understood that the computer-vision data can be present in various forms such as, for example, a matrix, a vector, etc. Optionally, the training data can include the image labels such as, for example, the (k×l)×1 vector of binary label.

At 620, a suitable classification algorithm is selected. The classification algorithm can be selected based on the characteristics of the training data, e.g., the computer-vision features obtained by processing the sample images. Suitable classification algorithm may include one or more of, for example, a decision tree model, a random forest model, an extra-trees model, a neural network model, a gradient boosting model, a bagging model, an adaptive boosting model, a linear discriminant analysis model, a quadratic discriminant analysis model, a naïve Bayes model, a nearest neighbor model, a radius nearest model, a logistic regression model, etc. A suitable classification algorithm can be selected to provide an accurate prediction/identification for test samples, to minimize training error, or minimize error on a validation dataset.

Figure 6B:
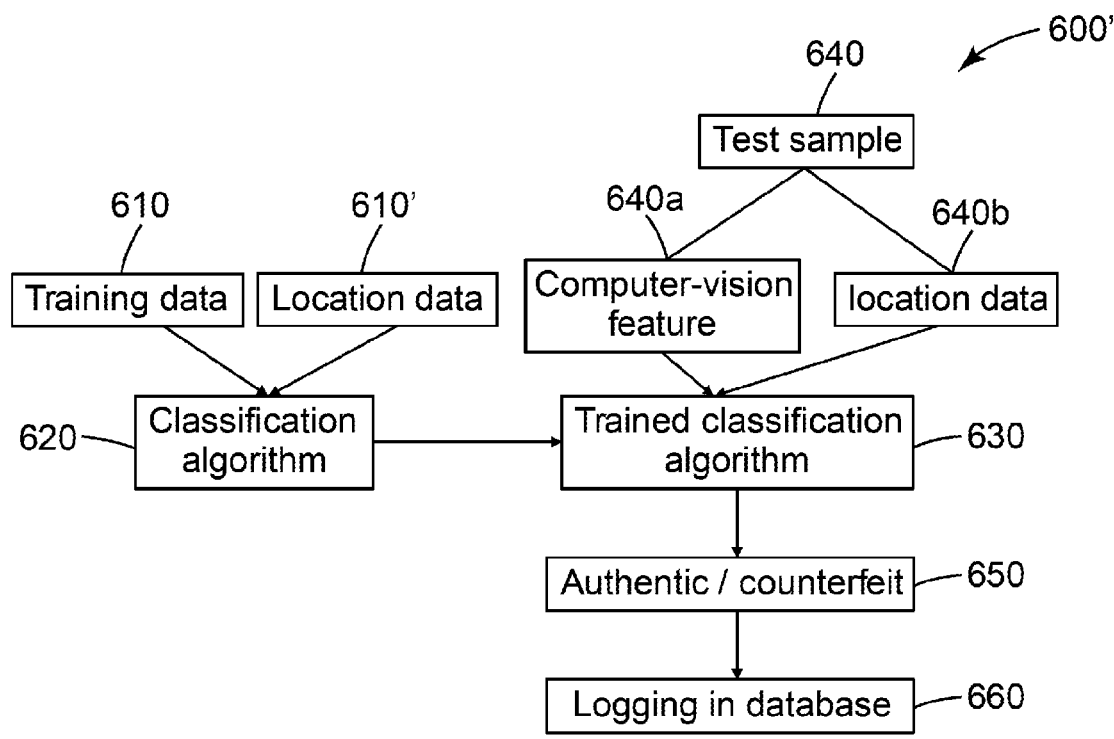
FIG. 6B a flow diagram of a method for obtaining a trained classification algorithm and using the trained classification algorithm to evaluate a test sample, according to another embodiment.

FIG. 6B illustrates a method 600' of training a classification algorithm and evaluating a test sample using the trained classification algorithm, according to one embodiment. In the method 600', location data 610' are provided along with the training data 610 to the classification algorithm 620. The location data 610' include location information and optional time information of material samples. In some embodiments, the location information can be obtained via a Global Navigation Satellite System (GNSS) receiver, using the GPS, GLONASS, Galileo or BeiDou system. In some embodiments, the digital images may be captured by a digital image device including a GNSS receiver. The digital image device can be, for example, a camera of a smartphone, and the location data 610' can be extracted from the GNSS data of the smartphone where the material samples are located.

In some embodiments, the location information can be extracted from a digital image file of the material samples. For example, the location information can be extracted from metadata of a digital image which include GNSS (e.g., GPS) data. The time information of the digital image can also be extracted from the metadata of the digital image. Metadata of a digital image allow information to be transported with an image file, which can be interpreted or extracted by a software, a hardware or a user. In some embodiments, the metadata can be entered into an image file by a user. In some embodiments, the metadata can be automatically obtained by a digital image device such as, for example, a camera, a scanner, etc. In some embodiments, the metadata can be internally embedded in an image file, in a format such as, for example, JPEG, Exif, TIFF, BMP, GIF, PNG, etc. In some embodiments, the metadata can be stored externally outside the image file.

It is to be understood that the location information of material samples or products can be obtained by any suitable methods. In some embodiments, a Wi-Fi device and/or other positioning mechanisms can be used for geospatial positioning.

In some embodiments, the data 610' also include time information for training purposes. For example, training data with relatively older time stamp might receive less weights of importance in the training compared to that with new time stamp. This helps to make the classification algorithm 620 adaptive to the changes of "birth and death" of products, especially counterfeits.

The location information and optionally, the time information of a material sample can be provided to the classification algorithm 620 in the form of a feature dimension of a feature vector of the material sample. For example, as described for FIG. 2, for an image of a material sample having l patches, the number l of such d-dimensional patch feature vectors $x_{patch}$ can be combined to form an (l×d) matrix of feature vectors. In some embodiments, the location information and optionally, the time information of a material sample can be added into the matrix of feature vectors as an additional feature dimension of each feature vector.

FIG. 7A illustrates an exemplary decision tree model 700. The training data (e.g., the (k×l)×d matrix of feature vectors from the method 200) can be applied as input data to train the model and determine the parameters in the model. With the determined parameters, a trained decision tree model is obtained. For example, with the input of d-dimensional vector x for a patch, parameters in the model (e.g., the scalars $y_1$, $y_2$, and $y_3$, the indexes $i_1$, $i_2$ and $i_3$, etc.)

Another exemplary classification algorithm is a logistic regression model represented by:

$$f(x) = \text{sign}\left(\frac{1}{1 + e^{-(b^T x + c)}}\right) \quad (2)$$

The training data (e.g., the (k×l)×d matrix of feature vectors from the method 200) can be applied as input data (e.g., the d-dimensional vector x) to train the model and determine the parameters (e.g., the scalar c, the vector b, etc.) in the model. With the determined parameters, a trained logistic regression model is obtained.

In some embodiments, the size or dimension of the patch feature vectors (e.g., the (k×l)×d matrix of feature vectors) can be further reduced during the training of a classification algorithm. In some embodiments, for a patch feature vector $x_{patch}$, the size or dimension can be further reduced by selecting features having higher importance weights. For example, for a 192 (12×16) dimensional feature vector corresponding to Gabor filters with a series of kernels (e.g., 16 kernels from 0 to 15 corresponding to 16 filtered images) as shown in the above expression (1), the training of a classification algorithm, e.g., an extra trees classification algorithm, can provide feature importance weights for each of the 192 features.

Figure 7B:
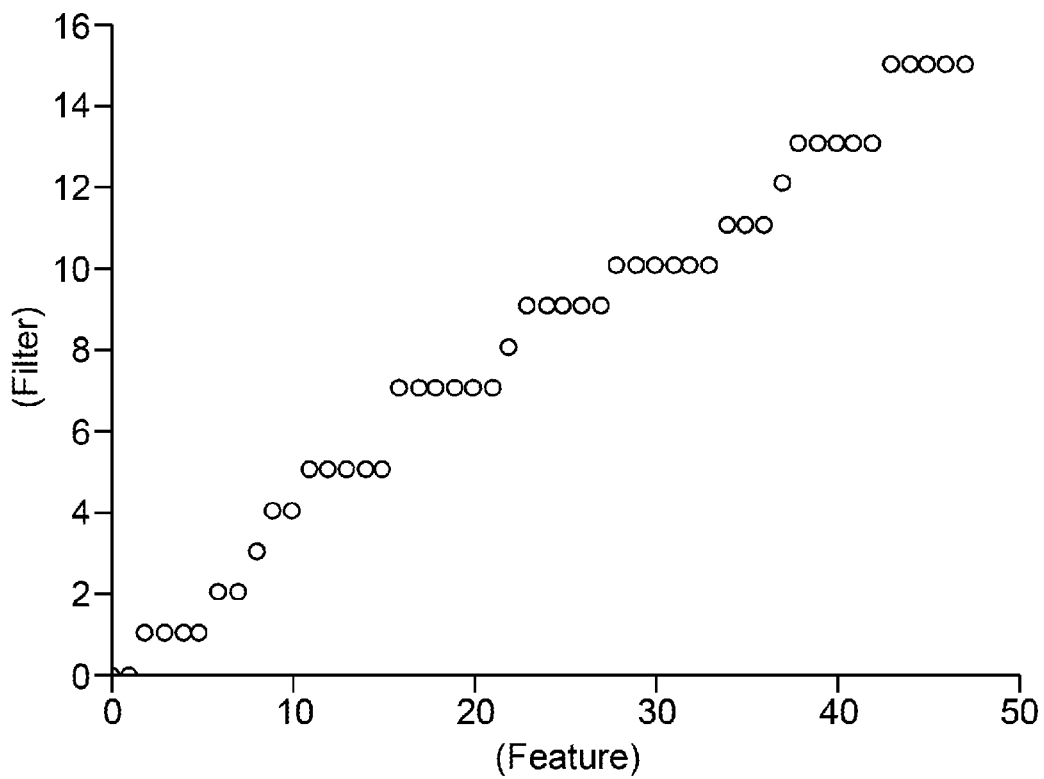
FIG. 7B illustrates a plot of the top 48 features organized by filters, according to one embodiment.

FIG. 7B illustrates a plot of the top 48 features (among the 192 features) organized by the series of filters (e.g., with 16 kernels from 0 to 15). Such feature importance weights can be used to reduce the dimensionality by selecting the more important features. This reduces noise and speeds up computation, especially when an entire set of features (e.g., a feature related to a specific filter) is eliminated. From FIG. 7B, a limited number of filters are selected to use. Those filters with the most number of top 48 features are targeted for use. This selection of features can further reduce training and feature computation.

Figure 8:
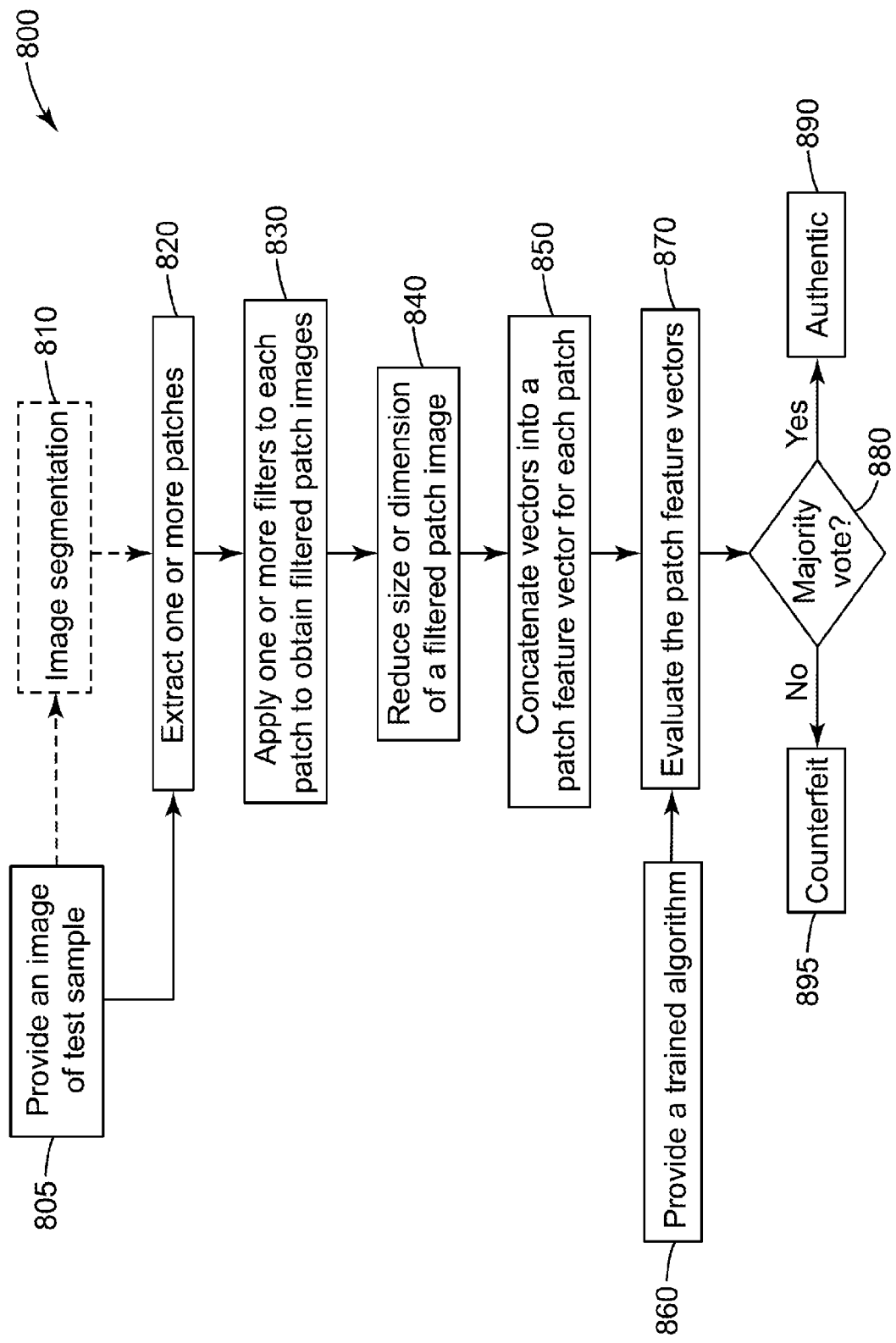
FIG. 8 is a flow diagram of a method for identifying a test sample, according to one embodiment.

Referring again to FIG. 6A, to identify the test sample, e.g., to determine whether the test sample is an authentic sample or a counterfeit at 650, the computer-vision features from the test sample at 640 can be evaluated by the trained classification algorithm at 630, which will be described further below. The computer-vision features of the test sample can be extracted from a digital image of the test sample and evaluated by a method 800 of FIG. 8, according to one embodiment. At 805, a digital image of the test sample is provided. At optional step 810, the digital image can be segmented, similar as in 210 of FIG. 2. The method 800 then proceeds to 820.

At 820, one or more patches are extracted from the test sample image, similar as in 220 of FIG. 2. The number l of patches may be, for example, from one to 1,000,000. Typical numbers may be around several hundreds to thousands. The patches may have a polygon shape (e.g., a square shape, a triangular shape, a hexagonal shape, etc.) with a patch size, for example, from 1×1 pixel to 1000×1000 pixels. It is to be understood that the suitable number of patches and the suitable patch size may depend on properties of the sample images (e.g., size, resolution, shape, quality, etc.). The method 800 then proceeds to 830.

At 830, one or more filters are applied to each patch to obtain one or more filtered patch images, similar as in 230 of FIG. 2. In some embodiments, a number m of filters can be applied to a patch to generate a number m of filtered patch images, where m is an integer (e.g., 8, 16, 32, etc.). For example, the Gabor filters can be applied with a series of kernels (e.g., 16 kernels from 0 to 15), which can result in a series of filtered images (e.g., 16 filtered images) for each patch. The method 800 then proceeds to 840.

At 840, the size or dimension of each filtered patch image is reduced, similar as in 240 of FIG. 2. In some embodiments, the size or dimension of the filtered patch images can be reduced by vectorizing each patch image into an n-dimensional patch feature vector, where n is an integer. It is to be understood that any other methods can be used to transform a filtered patch image into an n-dimensional vector. The method 800 then proceeds to 850.

At 850, the computer-vision data for the filtered patch images with reduced size/dimension are combined for each patch, similar as in 250 of FIG. 2. As described in 830 and 840, for each patch, a number m of filtered patch images can be obtained; for each filtered patch image, an n-dimensional vector can be obtained. The n-dimensional vectors for the m filtered patch images can be concatenated to form a d-dimensional patch feature vector $x'_{patch}$ for each patch, where d=(m×n). For example, for the Gabor filters applied with a series of kernels (e.g., 16 kernels from 0 to 15 corresponding to 16 filtered images), the 12-dimensional vectors of the 16 filtered images can be concatenated to form a final feature vector $x'_{patch}$ for the patch, e.g., a 192 (12×16) dimensional feature vector, similar as in the above expression (1). This process can be repeated for each patch to obtain a number l of such d-dimensional patch feature vectors, where l is the total number of patches extracted from the test sample image, and d=(m×n) is the dimension of a patch feature vector $x'_{patch}$. The method 800 then proceeds to 870.

At 870, each patch feature vector $x_{patch}$ is evaluated by a trained algorithm at 860 to a determine whether the corresponding patch is authentic or counterfeit. With the patch feature vector $x_{patch}$ as input data, the trained algorithm can output a binary 0/1 for each patch. For example, when the patch is from an authentic sample, the output is "1"; when the patch is from a counterfeit, the output is "0". The trained algorithm can be obtained by the method 600 of FIG. 6. The method 800 then proceeds to 880.

At 880, a final decision is made to identify the test sample by analyzing the outputs or votes for each patch. In some embodiments, a majority vote strategy can be applied where it is determined whether the majority of the patches is authentic or counterfeit. When the majority of the patches is authentic, the method 800 proceeds to 890 to determine that the test sample is authentic. When the majority of the patches is counterfeit, the method 800 proceeds to 895 to determine that the test sample is counterfeit. It is to be understand that other voting strategies can be applied by analyzing the outputs or votes for each patch.

Referring again to FIG. 6B, to identify the test sample 640 (e.g., to be authentic or counterfeit), the computer-vision features 640a from the test sample 640 and the related location and optional time data 640b of the test sample 640 can be evaluated by the trained classification algorithm at 630. In some embodiments, the location information and optional time data/information 640b of the test sample can be automatically extracted from its digital images or a digital device (e.g., a smartphone) that captures the images. For example, the location information (e.g., GNSS data) and time information can be extracted from metadata of its digital image file or directly from a mobile device (e.g., a smartphone) that captures the images. In some embodiments, the location and optional time data 640b can be manually inputted in the form of, e.g., hard codes, or specified by a user for different regions.

Similar to the location data 610', the location information and optionally, the time information 640b of the test sample can be provided to the trained classification algorithm 630 in the form of a feature dimension of a feature vector of the test sample.

The trained classification algorithm 630 can evaluate the computer-vision features 640a and the location and/or time information 640b of the test sample 640 to identify the test sample to be authentic or counterfeit and/or determine whether the test sample is at an expected location within a distribution network. At 660, the results of the evaluation can be automatically logged in a database which stores location information and timestamps of various counterfeits and/or authentic products.

It is to be understood that in some embodiments, the location and/or time data at 610' or 640b can be provided by a user, indicating certain product distribution information such as, for example, where and/or when the product was sold or is expected to be sold. When products flow through a distribution network (e.g., a supply chain), the product might be evaluated by customs in a location of the distribution network. If the product is not expected to be sold/transported/stored at the location, the method 600 can raise false exceptions after the evaluation.

A user can query the database 660 to determine various issues regarding the counterfeits. For example, a query of the database 660 can determine the number of counterfeits detected in a designated time period within certain mile radius of a location. The database 660 can be queried by using various statements such as, for example, time period, specific location, location radius, etc. In some embodiments, the results of the query can be visualized in a map.

Figure 6C:
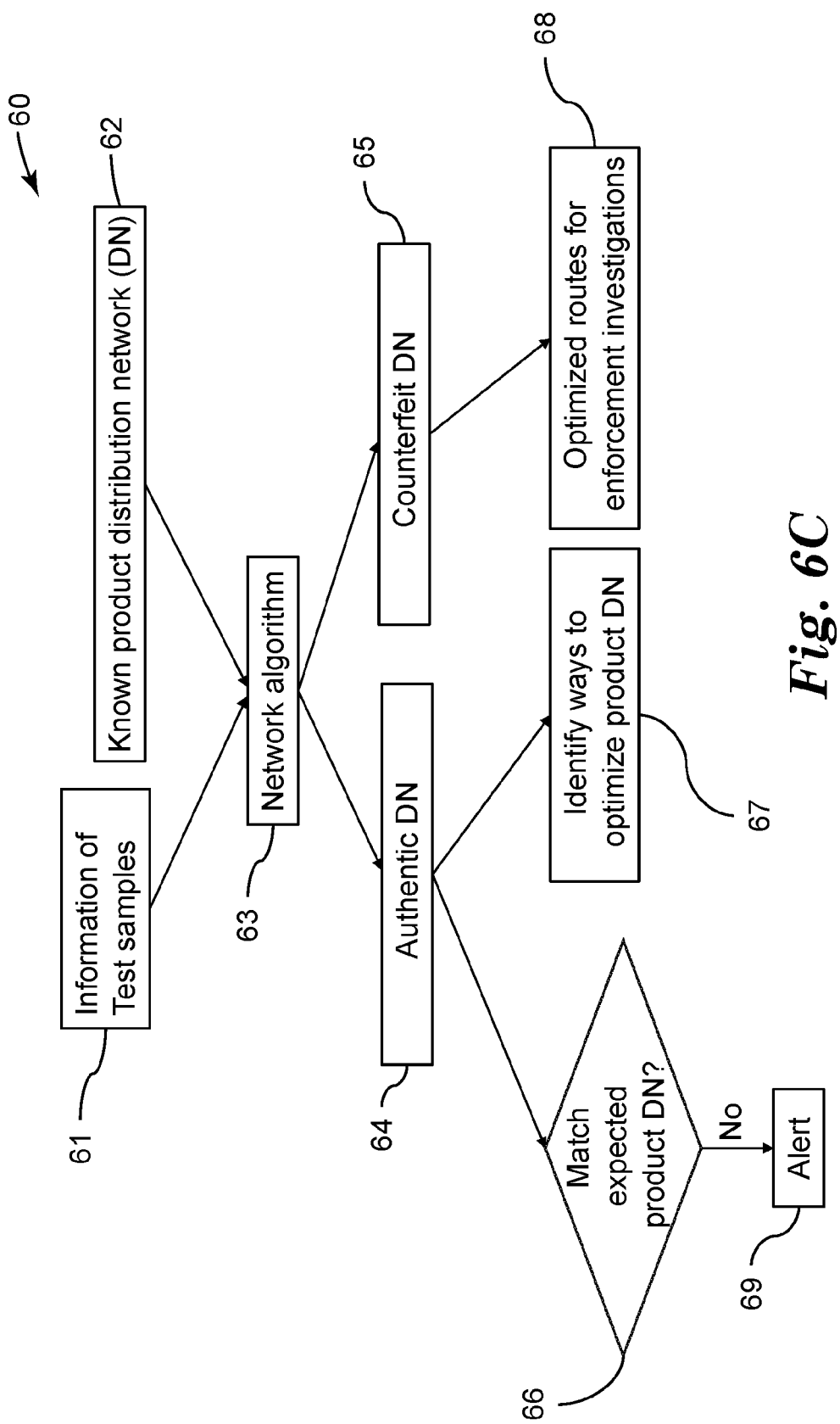
FIG. 6C is a flow diagram of a method of detecting a counterfeit distribution network based on the output of FIG. 6B.

FIG. 6C is a flow diagram of a method 60 of detecting a product (e.g., counterfeit or authentic) distribution network, and making further use of the detected networks. Training data can be provided to a network algorithm 63 to determine a distribution network (DN) of counterfeit and/or authentic product. The network algorithm 63 may include one or more graphical models that can model temporal locations of identified products and connections therebetween in a product distribution network. For example, a graph model may include nodes and connections therebetween, where the nodes represent various locations of counterfeits and connections represent counterfeit flow through a counterfeit distribution network (e.g., a supply chain). The graph model can include, for example, one or more spatial-temporal graphs to represent connectivity or flow in a product distribution network between different locations in different times. It is to be understood that the network algorithm 63 can include any suitable model or algorithm that represents a product distribution network.

The training data provided for the network algorithm 63 include data 61 of test samples and data 62 of known distribution networks (e.g., distributor or supply chain information) of authentic products. The information 61 of test samples can be imported from the database 660 of FIG. 6B. The data 62 can be imported from a centralized system that stores various known distribution networks of authentic products.

Training the network algorithm 63 can determine various information including, for example, information about authentic products distribution network (DN) 64, counterfeit distribution network (DN) 65, etc. In some embodiments, "historical counterfeit networks" from the database 660 of FIG. 6B can be leveraged to find some insights about new sources of counterfeits and their distribution networks. The authentic distribution network 64 can be compared at 66 to an expected distribution network (DN, e.g., supply chain) of authentic products (e.g., data 62 of known distribution networks) to determine whether the authentic distribution network 64 matches with the expected product distribution network. When the authentic distribution network 64 does not match with the expected product distribution network (e.g., a supply chain), an alert 69 can be sent out. In addition, the authentic distribution network 64 can be analyzed at 67 to identify ways to optimize current known product distribution networks (e.g., a supply chain).

The determined counterfeit distribution network 65 can be analyzed at 68 to determine routes for optimized enforcement investigations where counterfeits appear in the supply chain. For example, using the timestamps for each of the identified counterfeits, time-series data can be constructed at 68 about when the counterfeits are identified. This can allow investigation to focus anti-counterfeiting efforts, especially when a new location of counterfeit product is identified.

Figure 9:
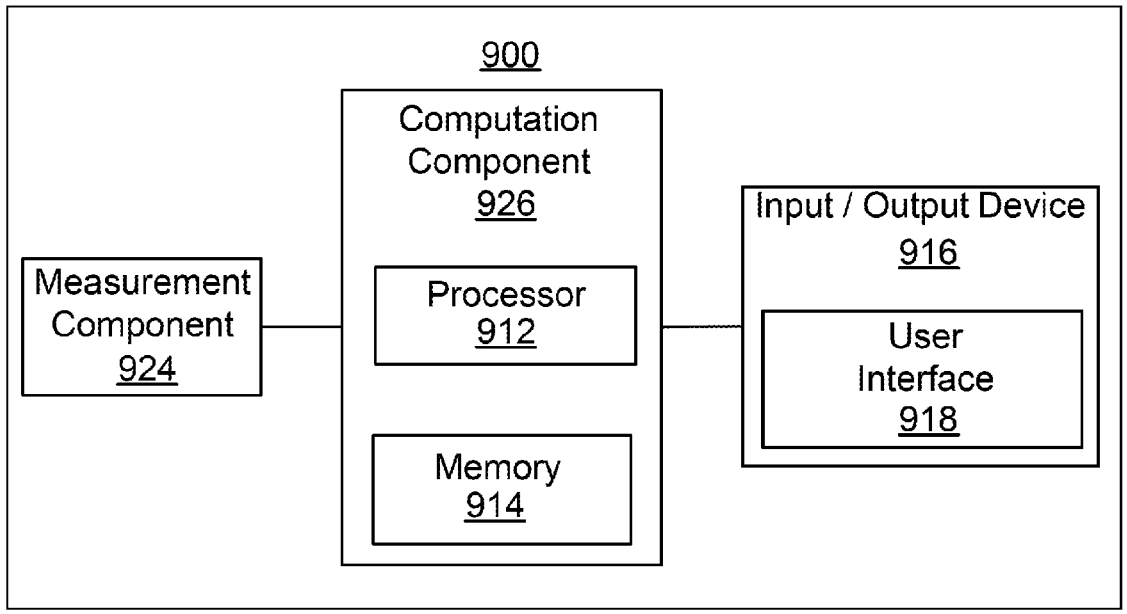
FIG. 9 illustrates a block diagram for a system of authenticating material samples, according to one embodiment.

FIG. 9 illustrates a system 900 for authenticating material samples by implementing any one of the computer-implemented methods described herein such as, for example, one or more of the methods 100, 200, 600, 700 and 800, according to some embodiments. The system 900 includes a measurement component 924, a computation component 926, and one or more input/output devices 916.

The measurement component 924 is configured to measure one or more characteristic features/properties of the material samples. The measurement component 924 can be various measurement tools to measure material properties including, for example, one or more of an optical feature, a texture feature, an acoustical feature, an elastic feature, a structural feature, an electronic feature, a magnetic feature, electrets, or a mechanical feature. In some embodiments, the measurement component 924 can include, for example, a digital camera of a mobile phone for capturing one or more images of material samples.

In the embodiment of FIG. 9, the computation component 926 includes a processor 912 and a memory 914. The computation component 926 is functionally connected to the measurement component 924 (e.g., a digital camera), receives signals related to the measured features (e.g., digital images for material samples) from the measurement component 924. The processor 912 can then process the digital images to extract computer-vision features and optionally obtain image labelling data by implementing the method 200, according to some embodiments. With the input training data (e.g., the computer-vision features, and optional image labelling data), the processor 912 can further train a classification algorithm to obtain a trained classification algorithm by implementing the method 600, according to some embodiments.

The image data and the trained classification algorithm can be stored in the memory 914. In some embodiments, the memory 914 may have a database to store image-related data including, for example, all the captured sample images and metadata of the images. Metadata may include, for example, timestamp of images, device time, IP address, user information, locations, etc.

In some embodiments, when a test material sample is to be authenticated, one or more corresponding characteristic features (e.g., a digital image) of the test material sample can be measured by the measurement component 924 (e.g., a digital camera). The computation component 926 can receive signals related to the measured features (e.g., digital images for material samples) from the measurement component 924 and process the signals. The processor 912 can process the digital image to extract computer-vision features (e.g., patch feature vectors for each patch) by implementing the method 800, according to some embodiments. The processor 912 can then evaluate, via the trained classification algorithm, the patch feature vectors for each patch to identify each patch, e.g., to determine whether the patches are authentic or counterfeit. The final decision about the test sample can be made, via the processor 912, by analyzing the votes of each patch.

In some embodiments, the measurement component 924 may be a digital camera of a mobile device (e.g., a mobile phone) that can work in field. The measurement component 924 can wirelessly communicate with a remote computing device such as, for example, the computation component 926 by sending and receiving signals. The computation component 926 may be integrated with, for example, a computer, a server, a mobile phone, etc. The computation component 926 can process the received material property signals and send the authentication information to the input/output device 916 to display thereon.

The memory 914 stores information. In some embodiments, the memory 914 can store instructions for performing the methods or processes described herein. In some embodiments, computer-vision feature data and the untrained, trained classification algorithms can be pre-stored in the memory 914. The computer-vision feature data may represent various material properties from the material samples, for example, an optical feature, a texture feature, an acoustical feature, an elastic feature, a structural feature, an electronic feature, a magnetic feature, an electrets-related feature, or a mechanical feature.

The memory 914 may include any volatile or non-volatile storage elements. Examples may include random access memory (RAM) such as synchronous dynamic random access memory (SDRAM), read-only memory (ROM), non-volatile random access memory (NVRAM), electrically erasable programmable read-only memory (EEPROM), and FLASH memory. Examples may also include hard-disk, magnetic tape, a magnetic or optical data storage media, a compact disk (CD), a digital versatile disk (DVD), a Blu-ray disk, and a holographic data storage media.

The processor 912 may include, for example, one or more general-purpose microprocessors, specially designed processors, application specific integrated circuits (ASIC), field programmable gate arrays (FPGA), a collection of discrete logic, and/or any type of processing device capable of executing the techniques described herein. In some embodiments, the processor 912 (or any other processors described herein) may be described as a computing device. In some embodiments, the memory 914 may be configured to store program instructions (e.g., software instructions) that are executed by the processor 912 to carry out the processes or methods described herein. In other embodiments, the processes or methods described herein may be executed by specifically programmed circuitry of the processor 912. In some embodiments, the processor 912 may thus be configured to execute the techniques for authenticating material samples described herein. The processor 912 (or any other processors described herein) may include one or more processors.

Input/output device 916 may include one or more devices configured to input or output information from or to a user or other device. In some embodiments, the input/output device 916 may present a user interface such as, for example, a graphical user interface (GUI) 918 where a user may control the authentication of material samples. For example, the input/output 916 may include a display screen for presenting visual information to a user. In some embodiments, the display screen includes a touch sensitive display. In some embodiments, the input/output 916 may include one or more different types of devices for presenting information to a user. The input/output 916 may include, for example, any number of visual (e.g., display devices, lights, etc.), audible (e.g., one or more speakers), and/or tactile (e.g., keyboards, touch screens, or mice) feedback devices. In some embodiments, the input/output devices 916 may represent one or more of a display screen (e.g., a liquid crystal display or light emitting diode display) and/or a printer (e.g., a printing device or component for outputting instructions to a printing device). In some embodiments, the input/output device 916 may be configured to accept or receive program instructions (e.g., software instructions) that are executed by the processor 912 to carry out the embodiments described herein.

The system 900 may also include other components and the functions of any of the illustrated components including the processor 912, the memory 914, and the input/output devices 916 may be distributed across multiple components and separate devices such as, for example, computers. The system 900 may be configured as a workstation, desktop computing device, notebook computer, tablet computer, mobile computing device, or any other suitable computing device or collection of computing devices. The system 900 may operate on a local network or be hosted in a Cloud computing environment. The illustrated components of FIG. 9 are shown merely to explain various aspects of the present disclosure and the addition or removal of components would be apparent to one of skill in the art.

Figure 10:
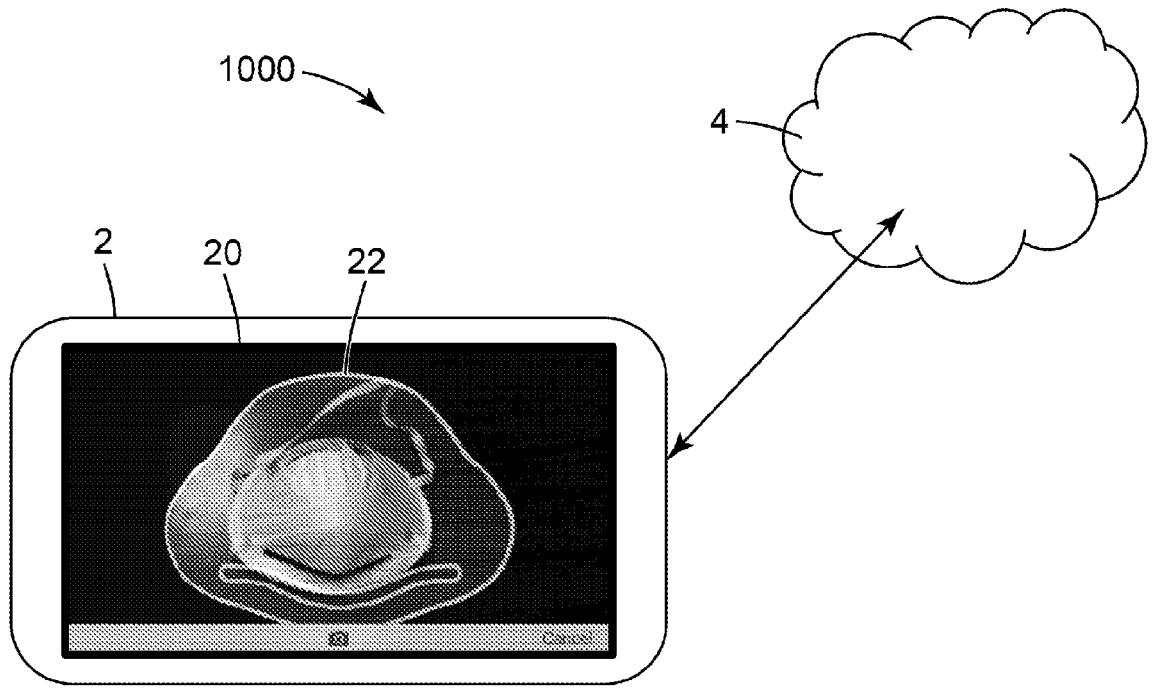
FIG. 10 illustrates a schematic diagram of a mobile device connected to a Cloud computing environment for authenticating material samples, according to one embodiment.

FIG. 10 illustrates an anti-counterfeiting system 1000, according to another embodiment. The system includes a graphical user interface (GUI) 20 provided to a mobile device 2. The mobile device 2 is capable of obtaining, via the GUI 20, one or more digital images for material samples. In the depicted embodiment, the mobile device 2 is a smartphone incorporating a digital camera (not shown). The GUI 20 includes a visual aide 22 to guide a user to capture the sample images. The visual aide 22 can include a box shaped to accommodate the image of the sample (e.g., a respirator) to be tested. It is to be understood that any suitable camera can be used to capture images for the material samples under desired lighting conditions. In some embodiments, the sample images can be captured by a separate camera and imported into the mobile device 2. The GUI 20 can access to the sample images and send the images to a computation component to process. An exemplary computation component 926 is shown in FIG. 9. A trained classification algorithm is associated with the computation component. The trained classification algorithm is configured to evaluate the computer-vision features of the sample images to identity the sample (e.g., to determine whether the sample is authentic or counterfeit), and return the decision to the GUI 20 to display to the user.

The mobile device 2 can be wirelessly connected to a Cloud computing environment 4. In some embodiments, the computation component can be a remote computation component located in the Cloud computing environment 4 and functionally connected to the mobile device, configured to receive the images from the GUI 20, and process the images. In some embodiments, the computation component can be located in the mobile device 2. In some embodiments, the computation component may include multiple, functionally connected processors distributed in the Cloud computing environment 4 and the mobile device 2. The sample images can be processed in a manner of distributed computing. The results of the image processing can be stored in a database (e.g., the database 660 of FIG. 6B) locally or in the Cloud computing environment 4. The location and/or timestamp of various material samples can also be stored in the database.

Figure 11:
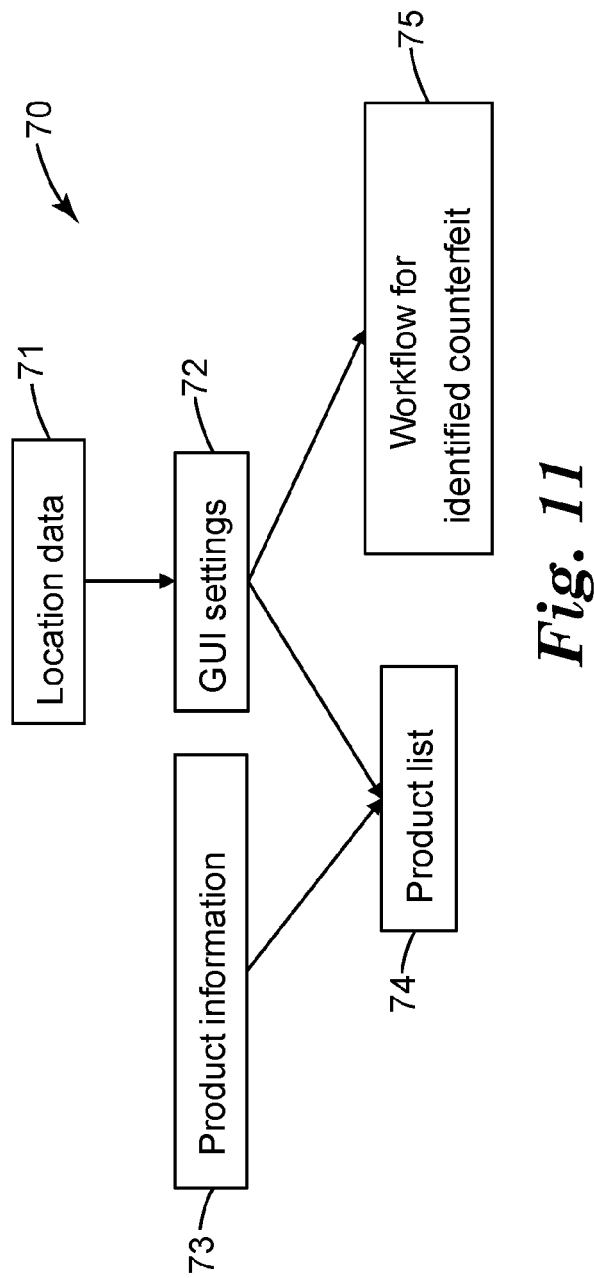
FIG. 11 is a block diagram illustrating an application of the GUI of FIG. 10, according to one embodiment.

In some embodiments, the GUI 20 can access to a database that stores location information and timestamps of various counterfeits and/or authentic products, and query the database upon a user's request. FIG. 11 illustrates a block diagram illustrating an application 70 of the GUI 20 of FIG.

10, according to one embodiment. The GUI 20 can have a setting 72 to query the database to obtain location and/or timestamp information 71 of the related material samples stored in the database, and query related production information 73 (e.g., top selling products by location) in the same or different database. Utilizing the obtained information, the GUI 20 can display at 74 a prioritized list of products that a user intends to identify (e.g., to be authentic or counterfeit). For example, the list can be prioritized by a computation component connected to the GUI 20 via referencing a database of the top selling products by location and/or time. When a counterfeit is identified, the GUI 20 can provide a complete workflow at 75 for the identified counterfeit. For example, the GUI 20 can allow the user to notify appropriate stakeholder, allow the user to contact appropriate customer service representatives (e.g., tech service). The GUI 20 can automatically query related databases to obtain the related information such as, for example, databases of key stakeholders by location, customer service contacts by location, etc.

Listing of Exemplary Embodiments

Exemplary embodiments are listed below. It is to be understood that any of embodiments in Embodiment Lists I and II can be combined.

Embodiment List I

Embodiment 1 is a computer-implemented method, comprising:
 providing to a processor, one or more digital images for each of a plurality of material samples;
 processing, via the processor, the digital images to extract computer-vision features;
 training, via the processor, a classification algorithm with the computer-vision features to obtain a trained classification algorithm;
 extracting, via the processor, computer-vision features from a digital image of a test sample; and
 evaluating, via the trained classification algorithm associated with the processor, the computer-vision features of the test sample to identify the test sample.

Embodiment 2 is the method of embodiment 1, wherein processing the images further comprises extracting one or more patches for each image.

Embodiment 3 is the method of embodiment 2, wherein processing the images further comprises obtaining one or more segmented regions from each image, the patches being extracted in the segmented regions.

Embodiment 4 is the method of embodiment 2 or 3, wherein processing the images further comprises obtaining a patch feature vector for each patch, the patch feature vector representing a material property of the respective patch, the computer-vision features of the digital images being represented by a matrix of the patch feature vectors.

Embodiment 5 is the method of embodiment 4, wherein the patch feature vector represents a texture property of a nonwoven material.

Embodiment 6 is the method of embodiment 4 or 5, wherein processing the images further comprises obtaining, via the processor, one or more filtered patch images for each patch.

Embodiment 7 is the method of embodiment 6, wherein processing the images further comprises reducing the size or dimension of each filtered patch image to a feature vector.

Embodiment 8 is the method of embodiment 7, wherein processing the images further comprises concatenating the feature vectors to obtain the patch feature vector for each patch.

Embodiment 9 is the method of any one of embodiments 4-8, wherein training a classification algorithm further comprises reducing the dimension of the patch feature vectors.

Embodiment 10 is the method of any one of embodiments 1-9, wherein training a classification algorithm further comprises training one or more of a decision tree model, a random forest model, an extra-trees model, a neural network model, a gradient boosting model, a bagging model, an adaptive boosting model, a linear discriminant analysis model, a quadratic discriminant analysis model, a naïve Bayes model, a nearest neighbor model, a radius nearest model, a logistic regression model.

Embodiment 11 is the method of any one of embodiments 1-10, further comprising labeling each image to be authentic or counterfeit.

Embodiment 12 is the method of any one of embodiments 2-11, further comprising labeling patches to be authentic or counterfeit.

Embodiment 13 is the method of any one of embodiments 1-12, wherein identifying the test sample further comprises determining whether the test sample is counterfeit or authentic.

Embodiment 14 is the method of any one of embodiments 1-13, wherein identifying the test sample further comprises determining whether the test sample belongs to a batch of material samples.

Embodiment 15 is the method of embodiment 13 or 14, further comprising returning the decision to a graphic user interface (GUI) on a mobile device.

Embodiment 16 is the method of any one of embodiments 1-15, wherein the processor is located in a Cloud computing environment.

Embodiment 17 is an anti-counterfeiting system comprising:
 a graphical user interface (GUI) provided to a mobile device, the mobile device being capable of obtaining, via the GUI, one or more digital images for a sample to be tested;
 a computation component functionally connected to the mobile device, configured to receive the images from the GUI, and process the images to extract computer-vision features from the images; and
 a trained classification algorithm associated with the computation component, the trained classification algorithm being configured to evaluate the computer-vision features of the sample to identify the sample, and return a decision to the GUI of the mobile device.

Embodiment 18 is the system of embodiment 17, wherein the computation component is further configured to process the images to extract one or more patches from each image.

Embodiment 19 is the system of embodiment 18, wherein the computation component is further configured to convert the patch into a patch feature vector for each patch, the patch feature vector representing a material property of the respective patch.

Embodiment 20 is the system of embodiment 19, wherein the computation component is further configured to obtain a plurality of filtered patch images for each patch.

Embodiment 21 is the system of embodiment 20, wherein the computation component is further configured to obtain a feature vector for each filtered patch image.

Embodiment 22 is the system of embodiment 21, wherein the computation component is further configured to concatenate the feature vectors to obtain the patch feature vector for each patch.

Embodiment 23 is the system of any one of embodiments 17-22, further comprising a database functionally connected to the computation component, and configured to store image data and metadata.

Embodiment 24 is the system of embodiment 23, wherein the computation component is further configured to process the image data of the database to extract computer-vision features, and train a classification algorithm with the computer-vision features to obtain the trained classification algorithm.

Embodiment 25 is the system of any one of embodiments 17-24, wherein the GUI includes a visual aide to guide a user to obtain the images.

Embodiment 26 is the system of any one of embodiments 17-25, wherein the GUI of the mobile device is functionally connected to a Cloud computing environment where the computation component is located.

Embodiment List II

Embodiment 1 is a computer-implemented method of identifying, tracking and locating a counterfeit product, the method comprising:
  extracting, via a processor, computer-vision features from a digital image of a test sample;
  obtaining location information of the test sample; and
  evaluating, via a trained classification algorithm associated with the processor, the computer-vision features and the location information of the test sample to identify the test sample.

Embodiment 2 is the method of embodiment 1, wherein the trained classification algorithm is obtained by:
  extracting computer-vision features from one or more digital images of each of a plurality of material samples;
  obtaining location information and optional time information of the material samples and
  training a classification algorithm with the computer-vision features, the location information and the optional time information.

Embodiment 3 is the method of embodiment 1 or 2, wherein extracting the computer-vision features includes converting the digital image to a matrix of feature vectors representing a material property of the test sample.

Embodiment 4 is the method of any one of embodiments 1-3, wherein the location information is extracted from Global Navigation Satellite System (GNSS) data.

Embodiment 5 is the method of embodiment 4, wherein the GNSS data is evaluated by the trained classification algorithm by inputting the GNSS data as a feature dimension of a feature vector.

Embodiment 6 is the method of any one of embodiments 1-5, further comprising obtaining time information of the test sample, wherein the time information is extracted from metadata of the digital image.

Embodiment 7 is the method of any one of embodiments 1-6, further comprising identifying the test sample to be authentic or counterfeit.

Embodiment 8 is the method of any one of embodiments 1-7, further comprising logging a result of the evaluation in a database.

Embodiment 9 is the method of embodiment 8, further comprising receiving a query to the database and providing related information according to the query.

Embodiment 10 is the method of embodiment 8 or 9, further comprising visualizing the result of the evaluation in a map.

Embodiment 11 is the method of any one of embodiments 8-10, further comprising detecting a distribution network of counterfeit and/or a distribution network of authentic products based on the database.

Embodiment 12 is a system of identifying, tracking and locating a counterfeit product, the system comprising:
  a graphical user interface (GUI) provided to a mobile device, the mobile device being capable of obtaining, via the GUI, one or more digital images for a sample to be tested;
  a computation component functionally connected to the mobile device, configured to receive the images from the GUI, and process the images to extract computer-vision features from the digital image, the computation component further configured to receive location information of the sample; and
  a trained classification algorithm associated with the computation component, the trained classification algorithm being configured to evaluate the computer-vision features and the location information of the sample to identify the sample.

Embodiment 13 is the system of embodiment 12, wherein the computation component is configured to convert the digital image to a matrix of feature vectors representing a material property of the sample.

Embodiment 14 is the system of embodiment 12 or 13, wherein the location information is extracted by the computation component from Global Navigation Satellite System (GNSS) data.

Embodiment 15 is the system of embodiment 14, wherein the GNSS data is evaluated by the trained classification algorithm by inputting the GNSS data as a feature dimension of a feature vector.

Embodiment 16 is the system of any one of embodiments 12-15, wherein the computation component is further configured to extract time information from metadata of the digital image.

Embodiment 17 is the system of any one of embodiments 12-16, further comprising a database functionally connected to the computation component, a result of the evaluation of the sample being logged in the database.

Embodiment 18 is the system of embodiment 17, wherein the GUI is configured to receive a query to the database and provide related information according to the query.

Embodiment 19 is the system of embodiment 17 or 18, wherein the GUI is configured to visualize the result of the evaluation in a map.

Embodiment 20 is the system of any one of embodiments 12-19, wherein the trained classification algorithm is further configured to identify the sample to be authentic or counterfeit.

Embodiment 21 is the system of any one of embodiments 12-20, wherein the GUI of the mobile device is functionally connected to a Cloud computing environment where the computation component is located.

Embodiment 22 is the system of any one of embodiments 12-21, wherein the GUI is configured to provide a workflow for the identified sample.

Exemplary embodiments of the present disclosure may take on various modifications and alterations without departing from the spirit and scope of the disclosure. Accordingly, it is to be understood that the embodiments of the present disclosure are not to be limited to the described exemplary embodiments, but are to be controlled by the limitations set forth in the claims and any equivalents thereof.

Reference throughout this specification to "one embodiment," "certain embodiments," "one or more embodiments," or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment," or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about." Furthermore, various exemplary embodiments have been described. These and other embodiments are within the scope of the following claims.

What is claimed is:

1. A computer-implemented method of identifying, tracking, and locating a counterfeit product, the method comprising:
   extracting, via a processor, computer-vision features from a digital image of a test sample, at least in part by:
      obtaining, from the computer-vision features, time information describing a time at which the digital image of the test sample was captured;
      forming a matrix of feature vectors representing a material property of the test sample by converting the digital image to a preliminary matrix of feature vectors and adding the time information to the preliminary matrix of feature vectors as an additional feature dimension of each respective feature vector of the preliminary matrix;
      extracting one or more patches from the matrix of feature vectors;
      applying one or more filters to the one or more patches to obtain one or more filtered patch images; and
      concatenating vectors associated with the one or more filtered patch images to obtain one or more patch feature vectors;
   obtaining Global Navigation Satellite System (GNSS) data indicating location information associated with the test sample;
   inputting, by the processor, the GNSS data, as a feature dimension of a respective feature vector of the matrix to a trained classification algorithm executed by the processor; and
   evaluating, via the trained classification algorithm executed by the processor, the computer-vision features and the location information associated with the test sample to identify the test sample as the counterfeit product.

2. The method of claim 1, wherein the trained classification algorithm is obtained by:
   extracting computer-vision features from one or more digital images of each of a plurality of material samples;
   obtaining location information and optional time information of the material samples; and
   training a classification algorithm with the computer-vision features, the location information and the optional time information.

3. The method of claim 1, further comprising logging a result of the evaluation in a database.

4. The method of claim 3, further comprising:
   receiving a query to the database; and
   providing, as output, related information according to the query.

5. The method of claim 4, wherein providing the related information as output comprises visualizing the result of the evaluation in a map.

6. The method of claim 3, further comprising detecting a distribution network of counterfeit products that includes the identified counterfeit product based on the database.

7. The method of claim 6, further comprising detecting a distribution network of authentic products based on the database.

8. The method of claim 1, further comprising determining, via the processor, a patch size for each of the extracted patches based on one or more of a size, a resolution, a shape, or a quality associated with the digital image.

9. The method of claim 8, wherein the patch size is in a range of 1 pixel by 1 pixel to 1000 pixels by 1000 pixels.

10. The method of claim 1, wherein the test sample is a respirator.

11. The method of claim 1, wherein the one or more filters comprise one or more of a Gabor filter, a Fourier transform filter, a Gaussian filter, a high-pass filter, a low-pass filter, a band-pass filter, a median filter, an averaging filter, a Laplacian of Gaussian filter, a Sobel filter, or a Prewitt filter.

12. The method of claim 1, wherein the GNSS data indicating the location information associated with the test sample is associated with global positioning system (GPS) data gathered from an image capture device used to capture the digital image of the test sample.

13. A system for identifying, tracking, and locating a counterfeit product, the system comprising:
   a memory configured to store a digital image of a test sample; and
   one or more processors in communication with the memory, the one or more processors being configured to:
      obtain, from the computer-vision features, time information describing a time at which the digital image stored to the memory was captured;
      form a matrix of feature vectors representing a material property of the test sample by converting the digital image to a preliminary matrix of feature vectors and adding the time information to the preliminary matrix of feature vectors as an additional feature dimension of each respective feature vector of the preliminary matrix;
      extract one or more patches from the matrix of feature vectors;
      apply one or more filters to the one or more patches to obtain one or more filtered patch images; and concatenate vectors associated with the one or more filtered patch images to obtain one or more patch feature vectors;

obtain Global Navigation Satellite System (GNSS) data indicating location information associated with the test sample;

input the GNSS data as a feature dimension of a respective feature vector of the matrix to a trained classification algorithm; and evaluate, using the trained classification algorithm, the computer-vision features and the location information associated with the test sample to identify the test sample as the counterfeit product.

14. The system of claim 13, wherein the test sample is a respirator.

* * * * *